United States Patent [19]

Pitroda et al.

[11] 3,760,371

[45] Sept. 18, 1973

[54] ASYNCHRONOUS DATA TRANSMISSION OVER A PULSE CODE MODULATION CARRIER

[75] Inventors: Satyan G. Pitroda, Villa Park; Bernard J. Rekiere, Addison, both of Ill.

[73] Assignee: GTE Automatic Electric Laboratories Incorporated, Northlake, Ill.

[22] Filed: Aug. 14, 1972

[21] Appl. No.: 280,361

[52] U.S. Cl. .................... 340/172.5, 340/146.1 BA

[51] Int. Cl. .................... G08c 25/00, H04l 1/08

[58] Field of Search .............. 340/172.5, 146.1 BA, 340/146.1 BE

[56] References Cited

UNITED STATES PATENTS

| | | | |
|---|---|---|---|
| 2,997,540 | 8/1961 | Ertman | 340/146.1 BA X |
| 3,526,837 | 9/1970 | Zegers | 340/146.1 BE X |
| 3,328,766 | 6/1967 | Burns | 340/172.5 |
| 3,452,330 | 6/1969 | Avery | 340/172.5 |
| 3,541,523 | 11/1970 | Bidlack | 340/172.5 |
| 3,671,945 | 6/1972 | Maggio | 340/172.5 |
| 3,381,272 | 4/1968 | Pasini | 340/146.1 BA |
| 3,426,323 | 2/1969 | Shimabukuro | 340/146.1 BA |
| 3,582,786 | 6/1971 | Bruglemans | 340/146.1 BA X |
| 3,624,603 | 11/1971 | Delcomyn | 340/146.1 BA |

*Primary Examiner*—Paul J. Henon
*Assistant Examiner*—Sydney R. Chirlin
*Attorney*—K. Mullerheim et al.

[57] ABSTRACT

A data transmission technique utilizing asynchronous data transmission over a pulse code modulation (PCM) carrier, with variable data rates with sufficent redundancy to accomodate error burst. Generally, data from a data source is accumulated in a register, and transferred in parallel to another register in packets of a predetermined number of bits easily handled from a switching standpoint. The data from the secd register is read out at intervals which are a submultiple of the carrier. The data is read out a minimum of three times, over a multiple of frames, suh that error burst can be tolerated. Due to the asynchronous nature of the information, some data will be transmitted four times, for the purpose of bringing the transmission system back into synchronism, to accomodate the variable data rates. In order to indicate the number of times the data is repeated, a definite pattern is assigned to the first bit portion of each packet of data which is transmitted. The format of these first bit portions is detected and analyzed in the receiver, to determine the number of times the data has been transmitted

7 Claims, 5 Drawing Figures

United States Patent [19] [11] 3,760,371
Pitroda et al. [45] Sept. 18, 1973
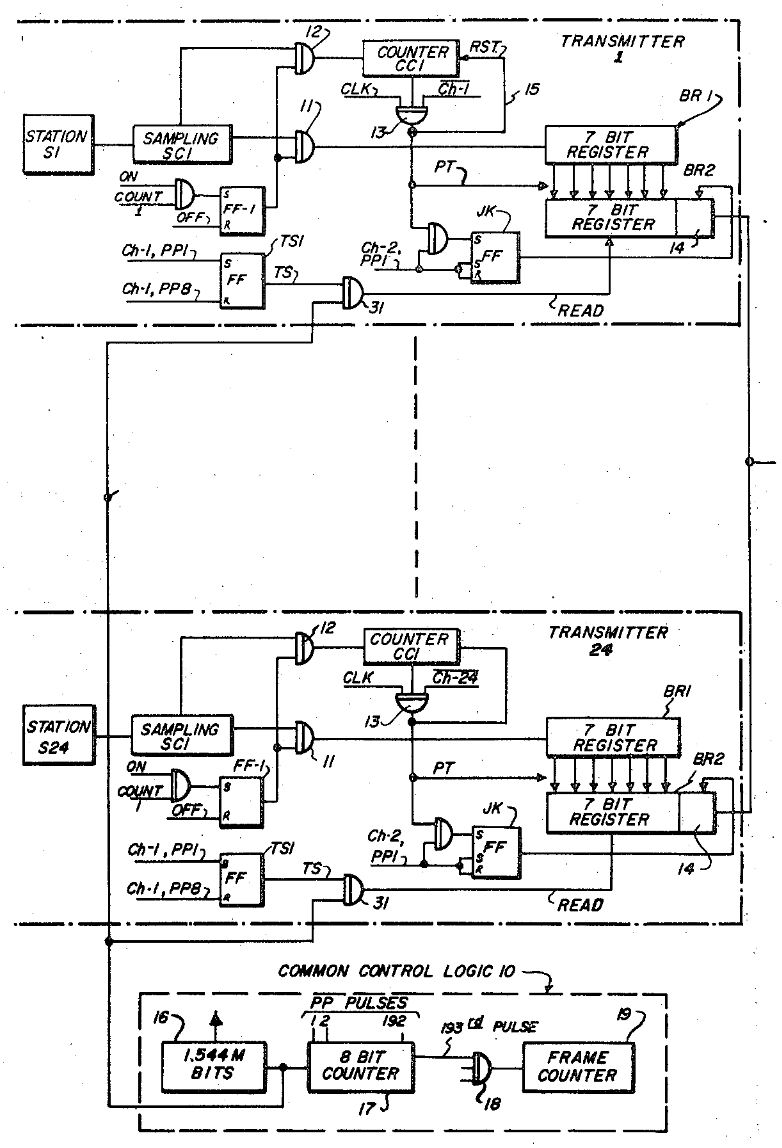

ASYNCHRONOUS DATA TRANSMISSION OVER A PULSE CODE MODULATION CARRIER

BACKGROUND OF THE INVENTION

This inventinon relates to a data transmission technique utilizing asynchronous data transmission over a pulse code modulation (PCM) carrier.

Pulse code modulation has become a predominant carrier for the transmission of voice and picture, but little has been done to use it as a means for the transmission of data. From the work which has been done, however, it has been found that the transmission of data over PCM with asynchronous, but highly accurate clocks, many times results in channel slots being repeated or lost. In the case of voice or pictures, little information is lost and the error rate generally is not detected by the listerner or viewer. However, in the case where the information is only "data", the error rate is an extremely important parameter in system design.

Accordingly, it is an object of the present invention to provide an improved data transmission technique utilizing asynchronous data transmission over a pulse code modulation (PCM) carrier.

More particularly, it is an object to provide an improved data transmission technique of the above type having a low error rate. In this respect, it is contemplated that the data transmitted is read out and transmitted a predetermined minimum number of times, with the repetition being over a multiple of frames, such that error burst can be tolerated.

Still another object is to provide an improved data transmission technique of the above type wherein the techniques of retransmission systems are employed, but retransmission is fixed for a normal operation and does not require a retransmission request from the receiver.

A still further object is to provide an improved data transmission technique of the above type wherein the first bit portion of every data packet transmitted follows in a predetermined established pattern, to indicate the number of times a data packet is or has been repeated.

SUMMARY OF THE INVENTION

Generally, in the data transmission system of the present invention, data from a data source is accumulated in a first register, and then transferred in parallel to a second register in data packets containing a predetermined number of bits. The data from the second register is read out and transmitted at intervals which are a submultiple of the carrier, a minimum of three times, over a multiple of frames. In order to indicate the number of times a data packet is repeated, a definite pattern is assigned to the first bit portion of every data packet. The receiver detects and analyzes the format of these first bits and determines the number of times the data packet has been transmitted. The arrangement and operation is such that error burst can be tolerated.

DESCRIPTION OF THE DISCLOSURE

Figure 1:
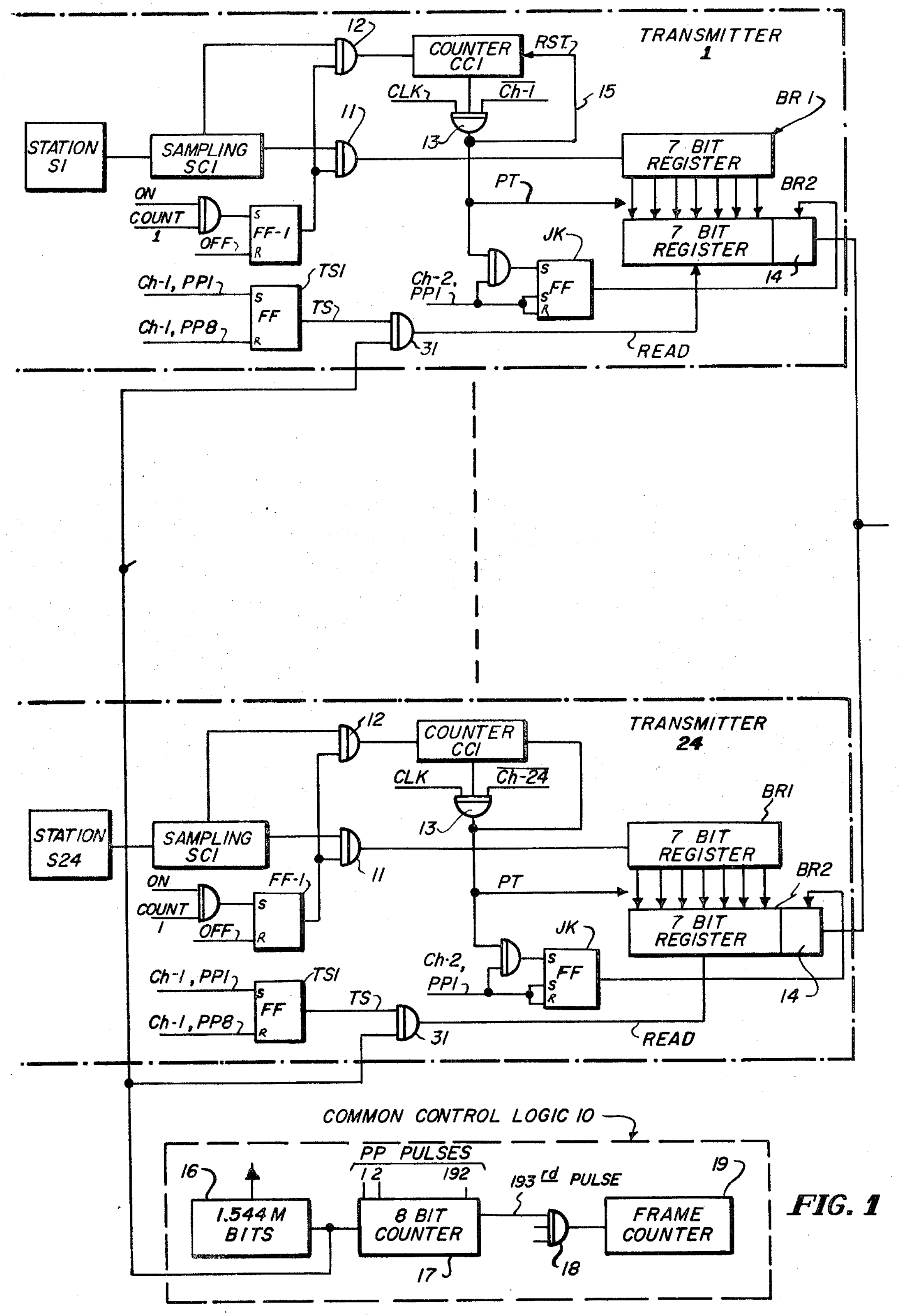
FIGS. 1 and 2, when arranged as shown in FIG. 5, is a block diagram schematic of a data transmission system exemplary of the invention.
Figure 2:
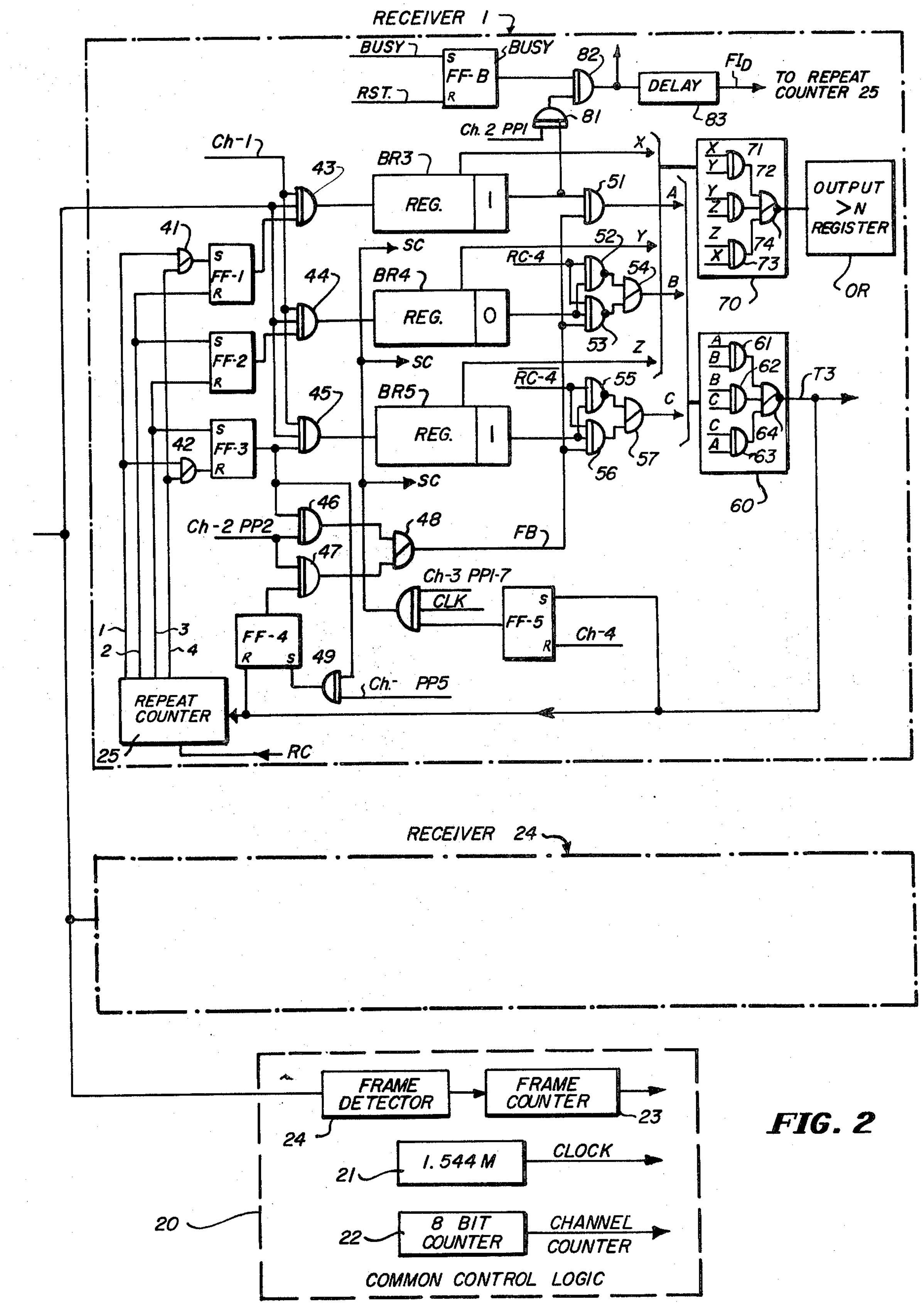

Referring now to the drawing, in FIG. 1 there are illustrated 24 stations S1–S24, each of which may be, for example, a digital computer or other data source. Each of these 24 stations S1–S24 includes a transmitter section which is coupled by a transmission bus B to an associated receiver section. The transmission bus B may be a metallic line, or conventional radio or carrier equipment.

Each of the 24 stations S1–S24 are multiplexed in time, by means not shown, to form a transmission carrier of 1.544 M bits, with each channel or time slot being 5.2 microseconds and the frame rate therefore being 125 microseconds. Only one channel or time slot per station is used, thus each channel or time slot reflects the station number. Such an arrangement is the most simple embodiment, but if a data rate higher than one which can use only one channel per frame is used, more than one channel per frame can be used. Correspondingly, if the data rate is a lower one, multiple stations can be multiplexed in a single channel, by time-sharing frames.

As indicated above, the data transmission system of the present invention uses variable data rates with sufficient redundancy to accomodate error bursts. Generally, the technique is to accumulate the data from the stations S1–S24 into a first register BR1, and to then subsequently transfer this data to another register BR2. The data packet which is an eight bit packet as more fully described below is read out at intervals which are a multiple of 8 khz which corresponds to the transmission carrier. The register BR2 at each of the stations S1–S24 is read out a minimum of three times, and the repetition is over a multiple of three frames.

However, due to the asynchronous nature of the information, some data will be transmitted four times in order to bring the transmission system back into synchronism, to accomodate variable data rates. In the present system, the first bit portion of every data packet is transmitted in a definite pattern to signify redundancy. By knowing the format of the first bit positions accumulated in the receiver, it can be determined whether the data has been transmitted three times or four times. The receiver then makes a majority decision on the data transmitted, and the result is stored in an output register OR, for retransmission.

More particularly, the data stored by the stations S1–S24 is sampled, in the illustrated embodiment, at a data rate of 18.7 khz, with seven bits of information being coupled to and accumulated in the respective ones of the first registers BR1. Accordingly, at a data rate of 18.7 khz, it can be seen that approximately 375 microseconds are required to accumulate the seven bits of information in a register BR1, or the equivalent of three frames. The data from the stations S1–S23 is sampled by the sampling circuits SC1 at each of the respective stations. The functional circuits of the transmitters and receivers associated with each of the stations S1–S24 in sampling, transmitting and receiving data are controlled by the common control logic 10 and 20, each of which is common to the transmitters and receivers, respectively.

The common control logic 10 includes a 1.544 M clock 16 which provides 0.65 microsecond clock pulses to the functional circuits of the transmitters associated with each of the stations S1–S24, as well as to the eight bit counter 17. The latter is operable to produce 192 pluse position pluses PP, each of which is 0.65 microseconds, and further counts the 192 pulse position pulses PP in groups of eight to provide channel pulses CH-1 through CH-24, each of which is 5.2 microseconds. Acccordingly, during each channel pulse CH, eight pulse position pulses PP1 through PP8 are provided and are so indicated. For example, the fifth pulse position pulse during channel 3 is indicated as CH-3, PP5. The eight bit counter 17 also provides an input through the AND gate 18 on the 193rd pulse to the frame counter 19, and the latter provides a framing pulse.

Correspondingly, the common control logic 20 includes a 1.544 M clock which may be a slave and an eight bit counter 22 which produces channel pulses and pluse position pulses, in the same fashion as the counter 17. The frame detector detects the 193rd pulse which is the framing pulse, and provides a repeat counter pulse RC to the repeat counter 25, for reasons set forth more fully below.

The operation of the data transmission system can be explained with reference to the transmitter and receiver of station S1. As indicated above, the data stored by station 1 is sampled by the sampling circuit SC1 at a data rate of 18.7 khz, with the data being accumulated in the register BR1 which is a seven bit register. A count seven counter CC1 counts these bits and sends out a parallel transfer pulse PT after every seventh bit is counted. These sampled information bits are gated by the count 1 flip-flop FF1, through the AND gate 11 to the register BR1 and through the AND gate 12 to the counter CC1.

The parallel transfer pulse PT is gated through the AND gate 13, by the coincidence of one of the clock pulses from the clock 16 and a $\overline{\text{CH-1}}$ channel pulse, and performs mainly three functions. In particular, this pulse PT enables the transfer of the seven information bits stored in register BR1 to the register BR2. It also sets the flip-flop JK to 1 to write 1 in the first bit position of the register BR2. It also is coupled back via the reset lead 15 to the counter CC1, and functions to reset the counter. As more fully explained below, the register BR2 is read out during channel 1, hence, the pulse PT is gated by $\overline{\text{CH-1}}$.

During channel 1 of every frame, the flip-flop TS is set by the CH-1, PP1 pulse, to provide an output TS pulse, and is reset by the CH-1, PP8 pulse. A TS pulse therefore is provided for a period to 5.2 microseconds, to the gate 31. The eight bit information stored in the register BR2 is read out during channel 1 of every frame, at the rate of the transmission carrier, by the clock 16 which couples clock pulses to the gate 31 at the same rate, to allow the information to be read from register BR2.

During channel 2, at pulse position 1, the CH-2, PP1 pulse sets the flip-flop JK to zero and zero is written into the first bit position of register BR2. At this time, the register BR2 contains the seven bits of information previously transferred into it from the register BR1, and a zero in its first bit position. During the next frame, the flip-flop TS again is set by the CH-1, PP1 pulse and the register BR2 is read for the second time. After it has been read the second time, the flip-flop JK is set to one, by the CH-2, PP1 pulse, to write one in the first bit position of the register BR2. When the register BR2 is read for the third time, the one in the first bit position is transmitted, instead of zero as during the second reading. Again, after reading the register BR2 for the third time, the one in the first bit position is changed to zero, during CH-2, PP1, as described above.

Accordingly, it can be seen that every time register BR2 is read out and transmitted, its first bit position is complimented, except when the PT pulse arrives which always sets this first bit position to a one.

During the time that the register BR2 is being read out the three times, the register BR1 has accumulated seven new information bits, and when the counter CC1 has counted the seventh bit, it will provide pulse PT. The latter will hange the zero in the first bit position of register BR2 to one, in the manner described above. During the next three frames, the register BR2 will again be read out three times, and a pattern of 101 in the first bit position will be transmitted. If register BR1 has not accumulated the seven new information bits, $\overline{\text{PT}}$ is present and no new information is transferred to register BR2. The information previously stored is transmitted for the fourth time, together with the zero in the first pit position, resulting in a pattern 1010 being transmitted to the receiver section. The effects of transmitting a pattern such as the pattern 1010 is set forth below, in the description of the operation of the receiver section.

In the operation of the receiver section, the frame detector 24 detects the framing pulse, and triggers the counter 22 to start counting the clock pulses from the clock 21, to provide 192 pulse position pulses, in groups of eight pulses PP1-PP8 and channel pulses CH. The frame detector 24 also couples the framing pulse to the repeat counter 25 which counts a maximum of four frames, except in the case of channel 24, as explained more fully below.

The repeat counter 25, in response to the framing pulse, counts one and sets the flip-flop FF1, via the OR gate 41. During channel 1, the eight bits of information read out of the register BR2 are received in the receiver section and stored in the register BR3. This information is gated into the latter through the AND gate 43, with coincidence of the receipt of the information, the output of flip-flop FF1 and a CH-1 pulse.

When the frame detector 24 detects the next or second framing pulse after 125 microseconds, the repeat counter 25 advances by one, and provides a count 2 pulse. The latter sets flip-flop FF2, and resets flip-flop FF1. The received information now is gated through the AND gate 44 and stored in the register BR4. Upon receipt of the next or third framing pulse, the repeat counter 25 provides a count 3 pulse which sets flip-flop 3 and resets flip-flop 2, so that the received information now is gated through the AND gate 45 and stored in register BR5.

During this third frame period, the AND gate 49 is enabled by the coincidence of pulse CH-1, PP5 and pulse FF3 from the flip-flop FF3, and sets the flip-flop FF4. With flip-flops FF3 and FF4 set and the receipt of pulse CH-2, PP2, the AND gates 46 and 47 both are enabled and, in turn, enable the OR gate 48 to provide a first bit compare pulse FB. The pulse FB is coupled to the AND gates 51, 53 and 56 to enable them to gate the information of the first bit position of all three registers BR3, BR4 and BR5 to the bit compare circuit 60 including the gates 61–64, for comparison. If the compared bits have a 101 pattern, a pulse T3 is provided which is coupled to and sets the flip-flop FF5. This pulse T3 also functions to reset the flip-flop FF4 and the repeat counter 25.

With the flip-flop FF5 set, its output pulse FF5 in coincidence with the clock pulses from the clock 21 and pulses CH-3, PP1 through CH-3, PP7 enables the AND gate 50 which then provides pulses SC to trigger the reading out of the seven bits of information stored in the registers BR3, BR4 and BR5. This read out is indicated by the reference letters X, Y and Z, and the information is compared by means of the bit comparing circuit 70 including the gates 71–74. The bit comparing circuit 70 makes a majority decision and stores the seven bits of information in the output register OR. The complete information is received during channel 1 of the third frame and is available at the output register OR, for retransmission, during channel 3. It therefore can be seen that the retransmitted channels are delayed two channels from the received channels.

As indicated above, under certain conditions, the information bits stored in register BR2 will be transmitted four times, with a resulting first bit position pattern of 1010. During the first three frames, the first bit positions are read out and detected by the bit comparing circuit 60 as 101, and a pulse T3 is provided. The pulse T3 causes the seven bits of information stored in the registers BR3, BR4 and BR5 to be read out and compared, in the manner described above. Also, the repeat counter 25 is reset so that on the next framing pulse, it is caused to count one and set the flip-flop FF1.

The information read from the register BR2 for the fourth time therefore is gated into and stored in the register BR3, with a zero appearing in its first bit position. During the next two frames, new information will be read from the register BR2 and transmitted, with this information being stored in the registers BR4 and BR5. The net effect, therefore, is then register BR3 contains information corresponding to that already recieved and stored in the output register OR, while the registers BR4 and BR5 each contain new information. Also, the pattern in the first bit positions of these respective registers is 010, rather than 101, as desired.

With a first bit position pattern 010, no pulse T3 is provided by the bit comparing circuit 60, thus the flip-flop FF5 is not set, nor are the flip-flop FF4 and the repeat counter 25 reset. Therefore, when the next framing pulse (corresponding to the start of the fourth frame) is received, the repeat counter 25 is caused to count four which, in turn, sets flip-flop FF1 and resets flip-flop FF3. The information read from the register BR2 and transmitted during channel 1 (which information corresponds to new information and contains a one in the first bit position) now will be written over the information stored in the register BR3. The first bit pattern, therefore, now is 110.

Since flip-flop FF4 was not reset by the T3 pulse, it is still set one and upon receipt of pulse CH-2, PP2, the gates 47 and 48 are enabled, thereby providing the pulse FB which causes the first bit positions to be read out and compared. The pattern of the first bit positions is 110, but it is desired to detect the pattern as 101. For this reason, two NAND gates 54 and 57 are provided, and are gated by pulse RC4 from the repeat counter 25, so that the bit comparing circuit 60 actually detects the pattern as 101 and provides a pulse T3. This T3 pulse then sets flip-flop FF5 and resets the flip-flop FF4 and the repeat counter 25. With flip-flop FF5 set, the information bits are read out of the registers BR3, BR4 and BR5, in the manner described above, and the bit comparing circuit 70 again makes a majority decision and stores the information bits in the output register OR, for retransmission.

When the next framing pulse is received, the repeat counter again is caused to count one, and set the flip-flop FF1 so that the next information received, which information corresponds to new information, is stored in register BR3. If the information again corresponds to information transmitted for the fourth time, the first bit pattern which is established again will eventually correspond to 110. As discussed above, this pattern is detected as 101 by the bit comparing circuit 60, to thereby initiate the read out of the registers BR3, BR4 and BR5.

From the above description, it can be seen that whenever the information in register BR2 is read three times, frame 1 is registered in register BR3, frame 2 is registered in register BR4 and frame 3 is registered in register BR5. When the information is transmitted a fourth time, the first three frames are read and stored in the same order as if it were merely transmitted three times. The next time the information is read, the fourth time, the frame 1 information is stored in register BR4 and frame 2 information is stored in register BR5 and the frame 3 information is stored in register BR3, thus creating a first bit pattern of 110. The information read for the fourth time never is read from the register BR3, but is subsequently written over.

Initialization

The established mode of initialization depends on the type of application in the field and the available signaling and can be accomplished in various different methods. One such method is as follows.

When a particular channel or station is idle, the information in the first bit position of the three registers BR3, BR4 and BR5 is 000. Accordingly, no pulse T3 will be provided. During the next frame, the repeat counter 25 therefore will count 4, resetting flip-flop FF3 and setting flip-flop FF1. The next information received at any time will be written into register BR3.

As soon as a station, such as station S1 is busy, a busy signal is received via the same transmission bus 10, or on a separate line. This busy signal sets the busy flip-flop B, indicating that the station is busy and the first information is expected at any time.

When the first information is received, it will be stored in register BR3. The flip-flop FF4 is set since no pulse T3 has been provided to reset it. Upon receipt of pulse CH-2, PP2, the gates 47 and 48 are enabled thereby producing pulse FB which, in turn, causes the read out of the first bit positions of the registers BR3, BR4 and BR5. Coincidence of the read out of the information in register BR3 and the pulse CH-2, PP2 enables the AND gate 81 which, in turn, enables the AND gate 82 and thus provides a pulse FI.

This pulse FI performs three functions. It first resets the repeat counter 25 and, after a delay provided by the delay circuit 83, it advances the repeat counter 25 to count one. It also resets the busy flip-flop B, so that the pulse FI is provided only once for initialization.

In this fashion, the next information received is stored in register BR4 where it is desired that the same be stored.

In the above description of the operation of the data transmission system, the possibilities of errors were not considered, and the following basic assumptions are made:

(1) errors will not occur in the same bit position in two consecutive frames; and (2) in the first bit position pattern, double errors will not occur.

Figure 3:
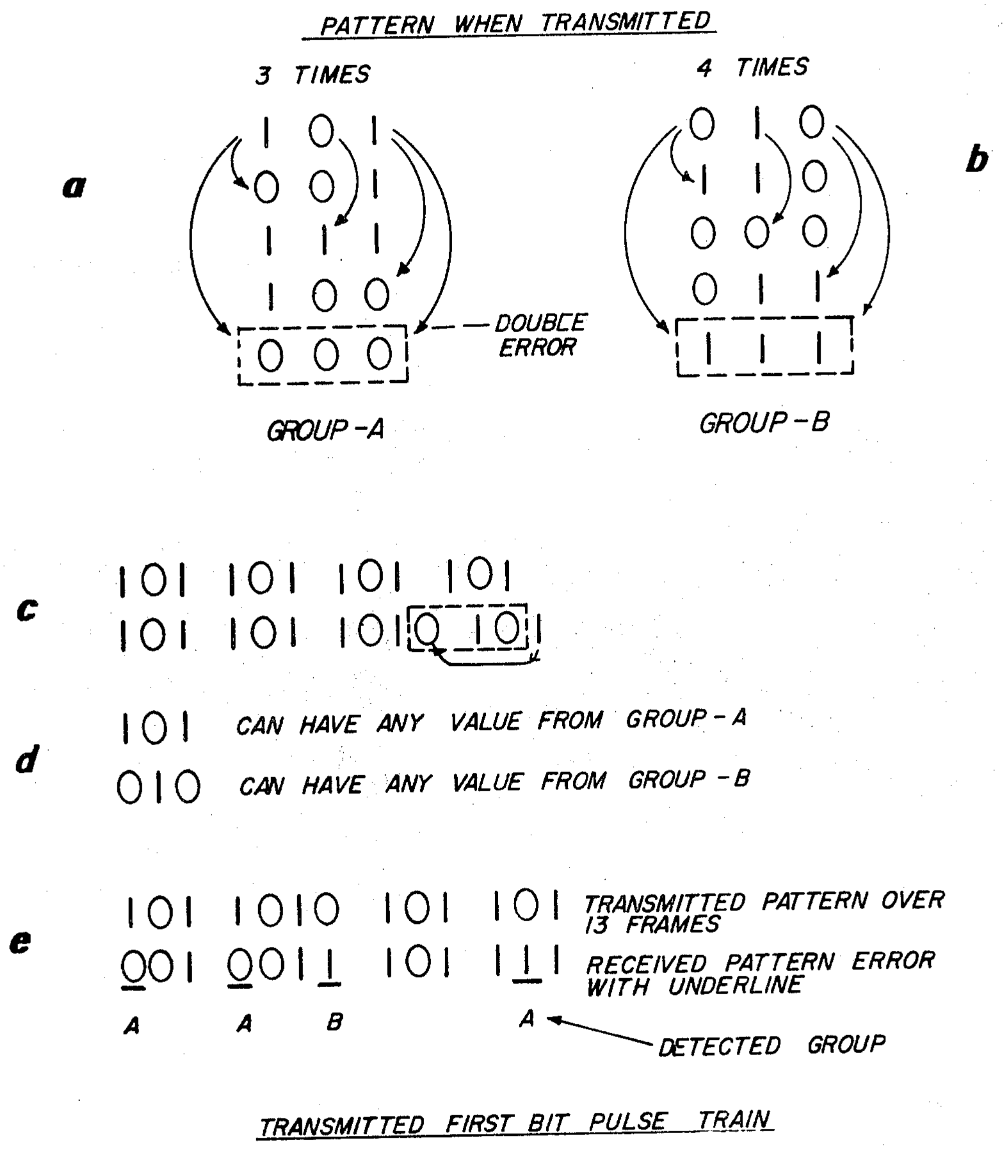
FIG. 3 generally illustrates the manner in which the first position bits can be transposed.
Figure 5:
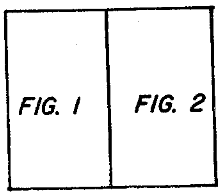
FIG. 5 is a view illustrating the arrangement of FIGS. 1 and 2.
Figure 4:
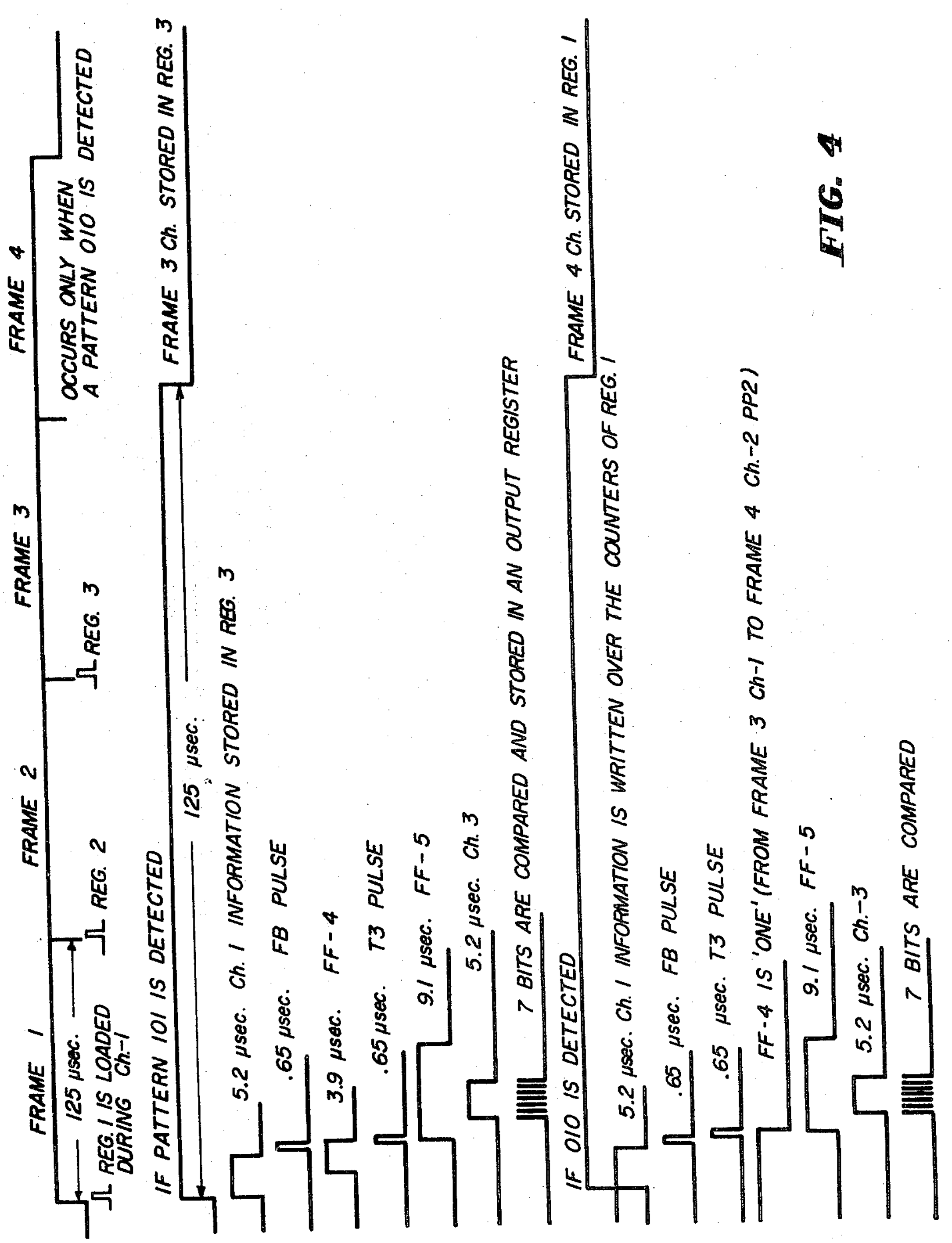
FIG. 4 illustrates the timing pulses of the receiver sections.

The basic patterns, as described above, are 101 and 1010. In FIG. 3, the manner in which these patterns can change is illustrated. In FIGS. 3*a* and 3*b*, three bit patterns 101 and 1010 are indicated as group A and group B, respectively, and the manner in which the bits may be transposed when transmitted are shown. The three bit patterns within the dotted boxes indicate a double error, with a bit being changed from 0 to 1, or 1 to 0. If an error occurs in both the first and third frame, such as, for example, in group A the ones in the first and third frames being changed to zeros so that 000 is received instead of 101, it will be difficult to determine whether 000 belongs to the three bit pattern of group A or group B. Since the pattern 000 belongs to group B, the pattern will be detected as 010, which, of course, is in error. It is assumed that double errors of this type will not occur.

In case of a double error, however, no matter what pattern it follows, the consecutive repetition of the fourth frame will be detected indicating double errors. When sure a double error exists in group A, the data is lost and is reordered. In the case of group B, the data is not lost because the information is transmitted four times.

This may be more clear from the following discussion of two specific cases of double errors occurring, the first being a double error resulting in 000 being received for Group A. In other words, the transmitted pattern is 101, 101 101, but the received pattern is 001, 101 and 101. The 000 pattern will be detected as belonging to group B and, as described above in the description of the operation of the receiver section, the procedure is to write the next frame information over the frame one information of this particular channel. That is, the information stored in register BR3 is written over. The result is that a pattern 100 occurs, and this pattern is detected as a pattern 111, because of the two NAND gates 54 and 57 at the outputs of the registers BR4 and BR5 which are gated by the repeat count RC4 from the repeat counter 25. The next pattern detected then will be 011, indicating group B again. In this manner, double errors of group A are detected as repetitions of patterns in group B and are interpreted as a double error.

In the case of a double error in group B, the pattern 1010, 101, 101 and 101 being transmitted and the pattern 1011, 111, 101 and 101 being received, the pattern 111 will be detected as group A. The next pattern received will be 110 indicating group B. In such a case, group B is detected only one pattern later, which follows the usual procedure of group B and the data transmission system operation will be normal during the next pattern.

From the above description, it can be seen that the data transmission system offers numerous advantages and improvements including the fact that variable data rates can be accomodated. Using this system technique, a T1 carrier can handle data rates up to 500 k bits. Data rates higher than 19 k bits are transmitted on the T1 carrier by assigning the required number of channel slots to the data user. For example, 61k bits of data can be transmitted by using three channel slots. Slow speed data can be super-multiplexed in a channel slot, and several data uses can share in time a single channel slot.

Since data words are repeated a minimum of three times and at a frame rate of 125 microseconds, the system will tolerate most burst type nosie. A far lower error rate is provided, since the data is repeated and a majority decision is made by the receiver section.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. A data transmission system employing a pulse code modulation carrier with the data sampling rate and the data transmission rate being such that an asyncrhronous data transmission mode of operation is established, said system comprising a common transmission path; a plurality of data sources multiplexed in time for transmission over said common transmission path, each of said data sources having associated with it a transmitter section coupled to one end of said common transmission path and a receiver section coupled to the other end thereof; said transmitter sections each comprising register means for storing sampled data bits from said data source and a first position bit, means for reading out and transmitting the contents of said register means a predetermined minimum number of times over multiple frames at intervals which are a submultiple of said carrier and periodically transmitting one additional time to bring said transmission system back into synchronism, means for complementing said first position bit every time the contents of said register means is read out and transmitted and transmitting said bit in definite pattern which indicates the number of times the contents of said register means has been read out and transmitted.

2. The data transmission system of claim 1, wherein each of said transmitter sections includes a first register means for accumulating therein a predetermined number of sampled data bits, and a second register means for receiving and storing said sampled data bits and a first position bit, said sampled data bits being transferred from said first register means into said second register means when said predetermined number of sampled data bits have been accumulated and the contents of said second register means thereafter being read out and transmitted.

3. The data transmission system of claim 2, wherein the contents of said second register means are read out and transmitted a minimum of three times over a multiple of three consecutive frames, and are read out and transmitted a fourth time to bring said system back into synchronism, whereby variable data rates can be accomodated.

4. The data transmission system of claim 3, wherein the contents of said second register means are read out and transmitted during the time slot assigned to said data source, and the sampled data bits are transferred from said first register means into said second register means during a subsequent time slot not assigned to said data source.

5. The data transmission system of claim 1, wherein said receiver sections each comprise register means corresponding in number to the minimum number of times the contents of said register means of said transmitter section are read out and transmitted; means for comparing said first position bits and determining the pattern thereof to thereby determine the number of times said contents were transmitted, and means for making a majority decision with respect to the sampled data bits stored in said register means, the sampled data bits corresponding to the majority decision being coupled to and stored in an output register means for retransmission.

6. The data transmission system of claim 2, wherein said receiver sections each comprise three register means, the transmitted contents being gated into and stored in the respective ones of said register means in consecutive order as said transmitted contents are received, the first position bit stored in said register means being compared and the pattern thereof indicating the number of times the transmitted contents have been transmitted, means responsive to predetermined patterns only of said first position bits for initiating the reading out of the stored sampled data bits from said register means, and means for making a majority decision with respect to the sampled data bits and for transferring the sampled data bits corresponding to the majority decision into an output register means for retransmission.

7. The data transmission system of claim 6, wherein the transmitted contents transmitted for the fourth time is written over the transmitted contents stored in the first one of said register means, the first position bit stored in said register means being compared and the pattern thereof indicating that the transmitted contents have been transmitted four times, said means responsive to predetermined patterns of said first position bits being rendered inoperative to initiate the reading out of the sampled data bits stored in said register means.

* * * * *